(12) United States Patent
Zhu et al.

(10) Patent No.: US 9,996,074 B2
(45) Date of Patent: Jun. 12, 2018

(54) SYSTEM AND PREDICTIVE MODELING METHOD FOR SMELTING PROCESS CONTROL BASED ON MULTI-SOURCE INFORMATION WITH HETEROGENEOUS RELATEDNESS

(71) Applicants: Yada Zhu, Yorktown Heights, NY (US); Jayant R. Kalagnanam, Yorktown Heights, NY (US)

(72) Inventors: Yada Zhu, Yorktown Heights, NY (US); Jayant R. Kalagnanam, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 15/271,367

(22) Filed: Sep. 21, 2016

(65) Prior Publication Data
US 2018/0081339 A1    Mar. 22, 2018

(51) Int. Cl.
*G06F 19/00* (2018.01)
*G05B 19/406* (2006.01)
(Continued)

(52) U.S. Cl.
CPC ......... *G05B 19/406* (2013.01); *G05B 19/041* (2013.01); *G06N 5/022* (2013.01); *G05B 2219/41354* (2013.01)

(58) Field of Classification Search
USPC ......................................................... 700/207
See application file for complete search history.

(56) References Cited

U.S. PATENT DOCUMENTS 4,766,552 A    8/1988 Alabu et al.
6,609,119 B1    8/2003 Meahlaoui
(Continued)

FOREIGN PATENT DOCUMENTS

CN    1322862 A    11/2001
CN    203080084 U    7/2003
(Continued)

OTHER PUBLICATIONS

Uher at al. "A new type of Aluminium Smelting Baths Electrical Conductivity", Acta Chimica Slovaca, vol. 2, No. 1, 2009, 25-30.*
(Continued)

*Primary Examiner* — Mohammad Ali
*Assistant Examiner* — Md Azad
(74) *Attorney, Agent, or Firm* — Thomas A. Beck; Daniel P. Morris

(57) ABSTRACT

The present invention is a system and predictive modeling method specially designed to improve process control and energy efficiency for a smelting process used to produce pure metal from an ore containing said metal. Data is collected from various sensor sources in the smeltering process to predict whether an increase or decrease is needed in controlling two variables comprising temperature and an additive that allows the reaction in the electrolytic process to proceed at a lower bath temperature. The invention provides a generalized framework to learn the complex heterogeneity embedded in the collected data, and employs a regularized non-negative matrix factorization problem, which simultaneously decomposes the instance-feature and instance-label matrices, while enforcing task relatedness, feature type consistency and label correlations on the collected data. The predictive modeling method disclosed herein effectively mines the hidden correlation among the heterogeneous data and improves the prediction accuracy.

15 Claims, 6 Drawing Sheets

(51) Int. Cl.
*G06N 5/02* (2006.01)
*G05B 19/04* (2006.01)

(56) References Cited

U.S. PATENT DOCUMENTS

| | | | |
|---|---|---|---|
| 8,052,859 | B2 | 11/2011 | Schnellar |
| 8,961,773 | B2 | 2/2015 | Fardeau et al. |
| 9,176,183 | B2 | 11/2015 | Zhu et al. |
| 2005/0288812 | A1* | 12/2005 | Cheng .............. G05B 19/41875 700/109 |
| 2007/0225835 | A1 | 9/2007 | Zhu |
| 2010/0065435 | A1* | 3/2010 | Schneller ................ C25C 3/20 205/337 |
| 2011/0094891 | A1* | 4/2011 | Fardeau .................. C25C 3/14 205/336 |
| 2015/0339572 | A1 | 11/2015 | Achin et al. |

FOREIGN PATENT DOCUMENTS

| | | |
|---|---|---|
| CN | 1807694 A | 7/2006 |
| CN | 204401118 U | 6/2007 |
| CN | 103014764 A | 4/2013 |
| CN | 103454986 A | 12/2013 |
| CN | 104164682 A | 11/2014 |
| CN | 104499001 A | 4/2015 |
| CN | 204538818 U | 8/2015 |
| RU | 2255149 C1 | 6/2005 |
| WO | WO2009067019 | 5/2009 |

OTHER PUBLICATIONS

Vanderlei Gusberti; Modeling the Aluminum Smelting Cell Mass and Energy Balance,—A Tool Based Upon the 1st Law of Thermodynamics.

* cited by examiner

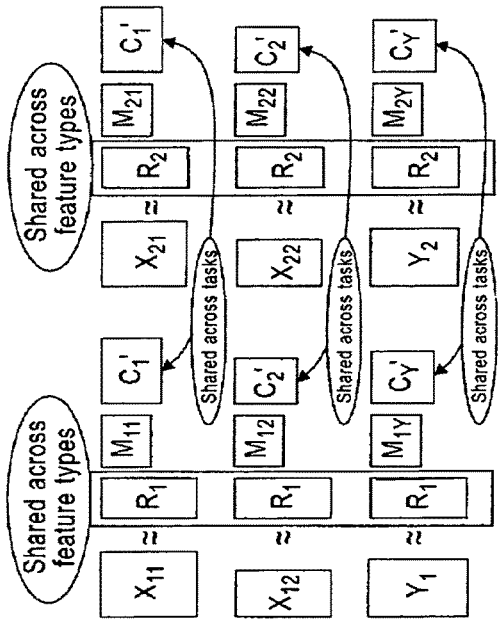

FIG. 6

- Decompose instance-feature data $X_{(1,1)}$ into 3 non-negative matrices
- Decompose instance-label data $Y_{(1)}$ into 3 non-negative matrices
- Regularize task relatedness, view (feature type) consistence, and label correlations

- Task relatedness: for the $j^{th}$ view/feature type, the decomposition of $X_{(1,1)}$ in different tasks share the same feature encoding matrix $C_{(1)}$
  - View/feature consistence: for the ith task, the decompositions of $X_{(1,1)}$ in different views share the same instance encoding matrix $R_{(1)}$
  - Label correlations: the labels share the same label encoding matrix $C_{(1)}$ across different tasks
  - $M_{(1,1)}$ models the correlations between the instance clusters and the features clusters
  - $M_{(1,1)}$ models the correlations between the instance clusters and the label clusters Solve the objective function iteratively Models 2 & 3 are formulated as using the following expession:

$$\{R,M,C\}>0 \sum_{i=1}^{T}\sum_{j=1}^{V} \left\| \bar{X}_{ij} - \bar{R}_i M_{ij} C_j^T \right\|_F^2 + \alpha \sum_{i=1}^{T} \left\| Y_i - R_i M_{iY} C_Y^T \right\|_F^2 + \beta \sum_{i=1}^{T}\sum_{j=1}^{V} \left\| M_{ij} - M_{iY} \right\|_F^2$$

Where T is the number of tasks, V is the number of views, M is the number of labels, respectively, F represents the Frobenius norm and $\alpha$ and $\beta$ are regularization coefficients

FIG. 7

SYSTEM AND PREDICTIVE MODELING METHOD FOR SMELTING PROCESS CONTROL BASED ON MULTI-SOURCE INFORMATION WITH HETEROGENEOUS RELATEDNESS

FIELD OF THE INVENTION

The present invention relates to methods and systems that monitor and control a more efficient smelting process using predictive modeling.

DESCRIPTION OF THE PRIOR ART

Smelting Process

Smelting is a form of extractive metallurgy; its main use is to produce a base metal from its ore. Smelting processes are used in the production of aluminum, silver, iron, copper and other base metals from their ores. Smelting involves more than just melting the metal out of its ore. Most ores are a chemical compound of the metal with other elements, such as oxygen (as an oxide), sulfur (as a sulfide) or carbon and oxygen together (as a carbonate).

To produce the metal, these compounds have to undergo a chemical reaction. Smelting therefore consists of using suitable reducing substances that will combine with those oxidizing elements to free the metal. Smelting makes use of heat and a chemical reducing agent to decompose the ore, driving off other elements, such as gases or slag, and leaving just the metal base behind.

More particularly, by way of example, to obtain metallic iron (Fe) from the iron ore ($Fe_2O_3$), it is necessary to smelt it out. The reducing agent used in the smelting process is commonly a source of carbon such as charcoal or more recently, coke. The carbon (or carbon monoxide derived from it) removes oxygen from the ore, leaving behind the elemental Fe metal. The carbon is thus oxidized in two stages, producing first carbon monoxide and then carbon dioxide. Since most ores, including iron ores, are impure, it is generally necessary to use flux, such as limestone, to remove the accompanying rock gangue as slag.

Copper is obtained using a smelting (i.e., refining) process to produce 99.99% pure copper. The ore used is selected from one of the following copper-containing ores: Copper pyrite or chalcopyrite ($CuFeS_2$), Chalocite ($Cu_2S$) or copper glance, Malachite green [$CuCO_3.Cu(OH)2$], Azurite blue [$2CuCO_3.Cu(OH)_2$], Bornite ($3Cu_2S.Fe2S_3$) or peacock, Melaconite (CuO), etc.

Copper is extracted from any of the aforementioned copper-rich ores by heating the ores in a furnace (smelting) and the copper is then purified by electrolysis.

The smelting process for obtaining aluminum separates alumina into its component parts of aluminum metal and oxygen gas by electrolytic reduction. The aluminum smelting is a continuous process that takes place in steel vats, each of which is called a reduction pot (hereinafter "pot") which are electrolytic cells. The aluminum production takes place in the potlines which comprises a plurality of enormous in-line pots on site with many pots in total. A substation on-site supplies electricity to the pots which are connected electrically so a current flows through one pot onto the next. The electricity reacts with the anodes (a black carbon block that lines each pot) and causes the alumina to separate into its constituent elements—aluminum and oxygen. The liquid aluminum is then siphoned from the pots using a method called tapping. The liquid metal is carried to the casthouse in ladles on top of specially designed vehicles.

At the casthouse impurities are removed and alloying elements such as magnesium and silicon are added according to its final use. Properties such as strength, corrosion resistance and surface quality are manipulated by this final chemical composition.

The liquid aluminum is cast into extrusion ingots, sheet ingots or foundry alloys, depending on the intended use. The aluminum metal is regularly removed from the pots for subsequent casting. The electrolytic reaction consists of:

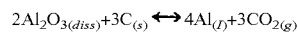

$$2Al_2O_{3(diss)} + 3C_{(s)} \longleftrightarrow 4Al_{(l)} + 3CO_{2(g)}$$

Within the reduction pot, alumina ($Al_2O_3$) crystals are dissolved in molten electrolyte bath comprising cryolite ($Na_3AlF_6$) and other additives such as excess aluminum fluoride ($AlF_3$), from 6 to 10 percent by weight of fluorspar, which is calcium fluoride ($CaF_2$), (the purposes of which are to improve the physico-chemical properties of the bath and to lower its melting temperature). The bath is kept in a molten state by the resistance to the passage of a large electric current. Smelter temperatures for the aluminum smelting process are typically around 1688°-1796° F. (920°-980° C.) thus forming an electrolytic solution that will conduct electricity from carbon rods (the anodes) to the carbon-lined bed of the pot (the cathodes).

The control of bath composition is an important operation in the aluminum production process. To reduce the melting point of the bath (pure cryolite in the bath melts at 1009° C.), the bath contains the fluorspar mentioned above and some excess aluminum fluoride, which along with the dissolved alumina, reduces the melting temperature sufficiently to permit the pots to be operated in the 920° to 980° C. range. The reduced operating temperature improves pot efficiency. The weight ratio of sodium fluoride/aluminum fluoride in cryolite is 1.00:1.50; the excess aluminum fluoride in the electrolyte is adjusted to yield a sodium fluoride/aluminum fluoride ratio in the 1.00:1.40 range by weight.

A direct current (4-6 volts and 100,000-230,000 amperes) is passed through the solution. The resulting reaction breaks the bonds between the aluminum and oxygen atoms in the alumina molecules. The oxygen that is released is attracted to the carbon rod anodes, where it forms carbon dioxide. The freed aluminum atoms settle to the bottom of the pot as molten metal.

The bottom of the pot is lined with carbon, which acts, as noted, as the cathode electrode (conductor of electric current) of the system. The anode electrodes consist of a set of carbon rods suspended above the pot; they are lowered into the electrolyte solution and held about 1.5 inches (3.8 cm) above the surface of the molten aluminum that accumulates on the floor of the pot.

A plurality of carbon block cathodes are cemented together to form the lining of the pot. Thermal insulation consisting of firebrick, vermiculite, or similar materials is placed between the pot cavity lining and the steel shell. Large steel bars, serving as electrical current collectors, are embedded in the bottom portion of the cavity lining and extend through openings in the shell to connect with the electrical bus which links one pot to the next.

Carbon pot linings normally last from 4 to 6 years. When failure of a lining occurs, usually via the penetration of aluminum metal through to the cathode collectors, the collectors dissolve. Then, the metal and sometimes the fused cryolite bath leak around the collectors. A sudden increase in iron levels in the aluminum usually indicates that a pot is nearing the end of its service life. The lining must then be repaired at the point(s) of failure by a procedure called "patching", or else the entire lining, insulation, and collector assembly is replaced.

The latter procedure is called "relining." Pot patching and pot relining are a significant part of the production expense and must be considered with respect to the overall efficiency of the process. Carbon anodes are a major requirement for the aluminum smelting process. About 0.5 tons of carbon is used to produce every ton of aluminum. There are two main types of carbon anodes used: pre-baked and "Söderberg." Both types are made from the same basic materials and react in the same way.

The anodes are formed from a mixture of petroleum coke and pitch which is strongly heated causing the pitch to bind the coke particles together. "Pre-baked" anodes are made before they are added to the pot, but "Söderberg" anodes are actually formed and baked in the pot.

The Söderberg anode uses the waste heat of reaction in each pot to pyrolyze the coke and pitch. As the lower part of the anode is consumed in the reaction, more raw materials are added at the top. During the baking process many volatile products are driven off as the pitch hydrocarbons are dehydrogenated. Solid carbon is left as the anode.

Although the Söderberg anode may be more energy efficient it is easier to treat the volatile wastes if they are not mixed with the other emissions from the pot. Dehydrogenation is often less complete in the Söderberg anode causing more hydrogen fluoride to be formed during the anode reaction. So, for environmental reasons, modern smelters use prebaked anodes.

The prebaked anodes consist of solid carbon blocks with an electrically conductive rod (e.g. copper) inserted and bonded in position usually with molten iron.

As noted above, reduction pots are arranged in rows (potlines) consisting of 200 to 300 pots (of different design and generation, running concurrently) that are connected in series ("a potline") to form an electric circuit. Each potline can produce 66,000-110,000 tons (60,000-100,000 metric tons) of aluminum per year. A typical smelting plant consists of two or three potlines.

In each pot, direct current passes from the carbon anodes, through the cryolite bath containing alumina in solution, to the carbon cathode cell lining and then to the anodes of the next pot and so on. Steel bars embedded in the cathode carry the current out of the pot while the pots themselves are connected through an aluminum bus-bar system.

A solid crust forms at the surface of the electrolyte. The crust is broken periodically and alumina is stilled into the electrolyte to maintain the alumina concentration.

As the electrolytic reaction proceeds, aluminum, which is slightly denser than the pot bath material, is continuously deposited in a metal pool on the bottom of the pot while oxygen reacts with the carbon material of the anodes to form oxides of carbon.

As the anodes are consumed during the process, they must be continuously lowered to maintain a constant distance between the anode and the surface of the metal, which electrically is part of the cathode. The anodes are replaced on a regular schedule.

Compounds of fluoride formed in side reactions are one of many volatile products formed during the process. In view of current environmental protection concerns, gases and solids evolved from the pot and its electrolyte must be controlled by various treatment processes.

An efficient commercially used method for removing these volatile products utilizes a highly effective pot hooding system which removes more than 99 percent of the fluoride emission from captured pot gases that are produced during the process.

This prevents air pollution, conserves valuable resources for recycling and, because it is a dry process, there are no liquid wastes to be disposed of.

Fluoride gases are passed through a bed of alumina where fluoride is adsorbed. The particulate matter is then collected in a fabric filter baghouse. The reacted or fluoride-containing alumina is recycled into the aluminum production process.

Relatively small amounts of fluoride are able to escape from the smelting process, typically during operations such as anode changing when sections of pot hooding are removed. These emissions are subject to E.P.A. discharge licenses. Continual efforts are made to improve work practices and processes to keep these emissions to a minimum.

The smelting process to produce aluminum described above is a highly energy-intensive industry. A substantial portion of the cost of running the process of aluminum production is in the enormous amount of electrical energy required.

Increasing energy costs and the compelling need for complying with the E.P.A. requirements for controlling low levels of polluting emissions place increasing financial and other demands on the aluminum manufacturers.

Thus there is a pressing need for a method that improves the energy efficiency of the aluminum production process, and more particularly, the more efficient use of the amount of electricity used in the process.

Since typical modern plants consist of many potlines, each potline consisting of 200 to 300 individual cells connected in series, it is incumbent upon manufacturers to be as efficient as possible.

Production Efficiency

In the late 1930s, the consumption of electricity in aluminum smelting averaged around 23.3 kilowatt hours per kilo of metal produced, whereas today, the most efficient pots run at close to 13 kilowatt hours per kilo.

The improvement is owed in part to the computerization of smelting cells. The computer takes into account the various current operating variables so that the voltage in the pot is always the best for prevailing conditions.

In addition to more efficient electricity consumption, other energy saving advances have been implemented including improvements in bath chemistry to lower both the smelting temperature and heat losses and increasing the efficiency of the use of electrical current. Other derivative benefits include improved insulation to reduce heat losses, improved baking technology for carbon anodes and reduced carbon anode consumption per kilogram of aluminum produced.

Using the aluminum smelting process as an example, the production efficiency of the aluminum smelting process is characterized by current efficiency (CE) and/or energy efficiency (EE). The CE/EE is affected by electrical shorting and other electrolytic reactions and a certain amount of re-oxidation of aluminum that is induced by abnormal process conditions. To maintain the CE/EE, i.e., the desired process conditions, various control actions are applied to adjust bath temperature, bath chemical composition, current and aluminum oxide content.

With respect to the amount of electricity used, for a smelting cell of 100% efficiency maintained at a given reaction temperature, the prior art calculates a theoretical production number.

The electrolysis process, such as that used in accordance with the present invention, involves passing an electric current through either a molten salt or an ionic solution. The ions are "forced" to undergo either oxidation (at the anode) or reduction (at the cathode). Most electrolysis problems are really stoichiometry problems with the addition of an amount of electric current. The quantities of substances produced or consumed by the electrolysis process are dependent upon the electric current used measured in amperes or amps, the number of electrons required to produce or consume 1 mole of the substance and time measured in seconds.

In electrolysis systems, there is a relationship between the charge and the quantity of matter liberated in an electrode reaction. This relationship is governed by the formula $F=eN_A$ (coulombs/mole) wherein $e \approx 1.6021 \times 10^{-19}$ coulombs (charge on one electron) and $N_A \approx 6.0221 \times 10^{23}$ mol/liter, (i.e., particles per mole).

Using Avogadro's Number ($6.0221 \times 10^{23}$) and using an elementary charge ($1.6021 \times 10^{-19}$ coulombs), the product of these numbers give the accepted value for F, (a "Faraday,") i.e., one Faraday=96,485 Coulombs.

Since the atomic weight of aluminum is 26.9815 and its valence is 3, one-gram equivalent weight contains Avogadro's number of atoms, and thus it takes 3 electrons to liberate one atom of aluminum. Therefore every Faraday liberates 26.9815/3 grams of aluminum.

If "I" is the current through a smelting cell, and all of this current (I) produces aluminum, then in 24 hours every such cell makes:

(I×24×60×60/96485)×(26.9815/3)/1000 kilograms of aluminum

Assuming that the current used is 180,000 amperes, which as typical of many smelters, then the theoretical production per cell as predicted by Faraday's Law is 1450 kilograms/day.

However, owing to electrical shorting and other electrolytic reactions and a certain amount of re-oxidation of aluminum, this theoretical production is not realized. In practice the term "current efficiency" is used, this being the percentage of the current that actually results in aluminum produced.

In practice, current efficiency is generally in the order of 90-95% so that the actual production per cell=Theoretical Production×CE/100.

Therefore, by way of illustration, the actual production in a 180,000 ampere cell at 90% current efficiency over 24 hours would be 1450×90/100 kilograms; i.e. 1305 kilograms.

A simplified equation for daily cell production is, therefore:

Production per cell per day=(Current×CE/100× 0.008054) kilograms

Given the daily cell production as defined above, the "Energy Efficiency" of the process can be calculated. If energy consumption is to be determined, then knowledge of the operating voltage of the cell is required. An estimate of this for some cells would be 4.5 volts.

The above production would therefore occur with a (DC) energy consumption of 180,000×4.5×24/1000 kilowatt-hours.

The electrical energy consumption per unit mass under the preceding scenario would be (Current×Volts×24/1000)/(Daily Production)=(Current×Volts×24/1000)/(Current×CE/100×0.008054). So, kWH/kg=Volts/CE×298 kilowatt-hours/kilogram With the numbers given, the energy efficiency is 14.9 kWH/kg, although the most efficient plants would achieve numbers between 13 and 14 kWH/kg.

For the reasons stated above, the two important variables to be considered with respect to realizing an efficient aluminum smelting process are the resistance and the concentration of alumina fluoride.

Approximately 13-16 kilowatt-hours of direct current electrical energy, one half kilo of carbon, and two kilos of aluminum oxide are consumed per kilo of aluminum produced.

As electrolysis progresses, the aluminum oxide content of the bath is decreased and is intermittently replenished by feed additions from the pot's alumina storage to maintain the dissolved oxide content at about 2 to 5 percent. If the alumina concentration falls to about 1.5 to 2 percent, the phenomenon of "anode effect" may occur. During anode effect, the bath fails to wet the carbon anode, and a gas film forms under and about the anode.

This film causes extra energy consumption resulting from high electrical resistance and the normal pot voltage, about 4 to 5 volts, increases 10 to 15 times the normal level. Correction is obtained by computer controlled or manual procedures resulting in increased alumina content of the bath.

Process Control

The aluminum smelting process described above is an electrolytic process with a plurality of process variables that are collected by computer means from different sources along the potline. In accordance with the present invention, the central process control that regulates the aluminum smelter process is a master level control. The "master level control" is a 9-box control that embodies four types of domain control based upon the combination of temperature and aluminum fluoride regulated by power and resistance control, noise control, alumina feed control and chemical combination control.

FIG. 2 plots variables temperature as a function of alumina fluoride. As noted above, aluminum fluoride impacts the bath temperature. A reduced bath operating temperature improves the CE/EE, whereas, also as noted above, too low of a bath temperature shortens the smelter's life.

For the smelter process to be efficient, the control of alumina feeding to the electrolytic cell must be based on inter alia, temperature and alumina concentration.

An excessive concentration of alumina often leads to the formation of "sludge," an undissolved slurry that is difficult to remove and causes inefficiencies in the current distribution in the cathode, thus disturbing cell operation.

An insufficient concentration of alumina may trigger an "anode effect," an undesirable event characterized by a rapid buildup of the gas layer below the anode-bath interface.

Anode effects increase cell resistance, causing cell voltage to increase rapidly. Anode effects can cause high power consumption, high bath temperature, production of carbon monoxide (CO) and carbon tetrafluoride ($CF_4$).

High temperature in the bath causes a partial melting of the "freeze" (that outer part of the bath that solidifies along the cell walls, to help protect the cell walls against the highly corrosive cryolite) and consequently destabilizes the thermal balance of the cell.

A stable energy balance helps to stabilize the bath temperature and freeze formation. If unstable, the freeze may melt or grow, both undesirable conditions. A good material balance helps keep the alumina concentrations at or near the optimal values.

The ideal operating point of the cell is where the alumina concentration and cell resistance are low. However, as alumina concentration is decreased, cell resistance increases rapidly. In order to avoid anode effects and their accompanying unfavorable conditions, it is of tantamount importance to carefully control both the temperature and the alumina concentration. The present invention controls these variables.

In view of an inordinately excess amount of electricity required for the electrolytic process described above, it would be beneficial to have a process for producing aluminum that is more efficient in the use of electricity and to monitor the aluminum fluoride consumption.

The four main types of domain control that are based upon the range of combinations of temperature and aluminum fluoride in the system, as mentioned above, include, but are not limited to, power and resistance control, noise control, alumina feed control and chemical combination control.

There are challenges however, to current domain control practice. The temperature and aluminum fluoride control variables currently are measured manually and consume operational resources due to the corrosive nature of the plant. In addition, currently, the temperature and aluminum fluoride measurements are only collected every 50 to 100 hours because the laboratory qualitative and quantitative analyses requires a lengthy time to complete.

There is a need to fill in the information gap that arises out of the time difference between ascertaining the measurements on cell temperature and aluminum fluoride concentration readings by using available data to predict a change in the cell temperature and aluminum fluoride concentration variables.

The need described above is solved in accordance with the present invention using predictive modeling which predicts the change direction (increase or decrease) of the cell temperature and aluminum fluoride concentration (labels) when they are not manually collected.

During the present invention smelting process, hundreds of process variables that reflect the process state, controls signals and control responses are collected via various sensors at finer granularity, e.g., every 10 seconds, 5 minutes or daily.

The collected process variables combined with existing available (historical) measurements of temperature and aluminum fluoride are used for predictive modeling and estimating temperature and/or aluminum fluoride between their measurements.

The predicted temperature and aluminum fluoride readings prompt: i.) a 9-box matrix control of the aluminum smelter process in the finer granularity noted above; ii.) a proactive response to any abnormal process conditions; improved productivity by reducing energy consumption, thereby increasing EC/EE; iv.) a reduction in process variation and abnormal events, such as anode event, electrical shorting and re-oxidation of aluminum.

The major challenge in employing the use of predictive modeling is the triple types of heterogeneity embedded in the data. The smelting process usually runs concurrently on 200 to 300 smelters which may be of different design and generation. The process variables come from diverse sources due to control practice. Further, there are multiple correlated labels, i.e., temperature and aluminum fluoride associated with each data instance.

The prediction target in the instant novel method is the aluminum process although it can be used in any of the metal smelting processes first mentioned above. Applicants' method uses multi-task learning, wherein a task is a model associated with the features (process variables) and label/target from a single source, in this case, a pot.

Multi-task learning (MTL) is an approach to machine learning that learns a problem together with other related problems at the same time, using a shared representation. This often leads to a better model for the main task, because it allows the learner to use the commonality among the tasks. Therefore, multi-task learning is a kind of inductive transfer.

This type of machine learning is an approach to inductive transfer that improves generalization by using the domain information contained in the training signals of related tasks as an inductive bias. It does this by learning tasks in parallel while using a shared representation; what is learned for each task can help other tasks be learned better. The goal of MTL is to improve the performance of learning algorithms by learning classifiers for multiple tasks jointly. This works particularly well if these tasks have some commonality and are generally slightly under sampled. Multi-task learning works, because encouraging a classifier (or a modification thereof) to also perform well on a slightly different task is a better regularization than uninformed regularizers (e.g. to enforce that all weights are small).

In Applicants proposed method, the collected data heterogeneity comes not only from the smelters/machines, but also from different types of features/process variables (i.e., different sources based on the process control practice) and multiple labels associated with each data instance. The major challenge for predictive modeling with the triple types of heterogeneity in the method is mining the hidden correlations among the heterogeneous data.

U.S. Pat. No. 6,609,119 discloses a neural control logic scheme based on prediction and pattern recognition techniques to control electrochemical processes such as alumina cells. The pattern-recognition capacity of LVQ-type neural networks is used to provide a closed-loop control structure to the feeding of a cell as a function of cell resistance, alumina concentration and cell condition.

U.S. Pat. No. 9,176,183 discloses a method and system for wafer quality and predictive modeling based upon multi-source information with heterogeneous relatedness.

This invention is restricted to data heterogeneity induced by chamber/machine where wafers are fabricated. The prediction target is a single process outlet. Wafer thickness. This is referred to as multi-task learning, wherein a task is a model associated with the features (process variables) and label/target from a single machine.

These references are not pertinent with respect to the present invention as it is directed to a system and predictive modeling technique that deals with triple types of heterogeneity.

SUMMARY OF THE INVENTION

The present invention is a system and predictive modeling method specially designed to improve process control and energy efficiency for a smelting process used to produce pure metal from an ore containing said metal. The present invention collects data from various sensor sources in the smeltering process to predict whether an increase or decrease is needed in controlling two variables comprising temperature and an additive that allows the reaction in the electrolytic process to proceed at a lower bath temperature. In the case of the production of aluminum metal, the additive is $AlF_3$. In order to improve the production performance, the present invention provides a generalized framework to learn the complex heterogeneity embedded in the collected data. The present invention formulates the problems found in prior art methods as a regularized non-negative matrix factorization problem, which simultaneously decomposes the instance-feature and instance-label matrices, while enforcing task relatedness, feature type consistency and label correlations on the collected data. The predictive modeling method disclosed herein effectively mines the hidden correlation among the heterogeneous data and improves the prediction accuracy.

The present invention is disclosed and illustrated in terms of production of aluminum, but it must be recognized that the method employed in the present invention can be utilized with any of the metals disclosed above.

The present invention uses non-negative matrix triple factorization procedure to model task relatedness by requiring that different feature types across different tasks share the same feature clustering coefficients and enhance feature type consistency by requiring that the instances share the same instance clustering coefficients across differ feature types, and model the label correlations by requiring that the labels share the same label clustering coefficients across different tasks.

The advantages of the predictive modeling method of the present invention as compared with prior art methods are: 1.) proactively response to shift; 2.) effectively reduce process variation; 3.) improve the current/energy efficiency and 4.) improve the prediction accuracy of key control decision variables.

BRIEF DESCRIPTION OF THE DRAWINGS

FIG. 6 is a more detailed predictive modeling approach relating to two of the models disclosed in FIG. 5.

FIG. 7 depicts the expression for formulating the two models of FIG. 6.

DESCRIPTION OF THE PREFERRED EMBODIMENT

The system and predictive modeling technique for a smelting process control, is based upon multi-source information with triple types of heterogeneity that improves the efficiency of, preferably, an aluminum smelting process.

The triple types of heterogeneity comprise chamber/machine, source of features/process variables and multiple correlated data instance labels. The present invention addresses a novel setting in model-based predictions where each pot in the smelting manufacturing process represents a single modeling task that predicts whether a temperature and/or additive (aluminum fluoride) in the system should be raised or lowered or remain unchanged, based on historical data.

It is understood that the methods and systems discussed in the present disclosure include some conventional structures and/or steps. Since these structures and steps are well known in the art, they will only be discussed in a general level of detail.

Figure 1:
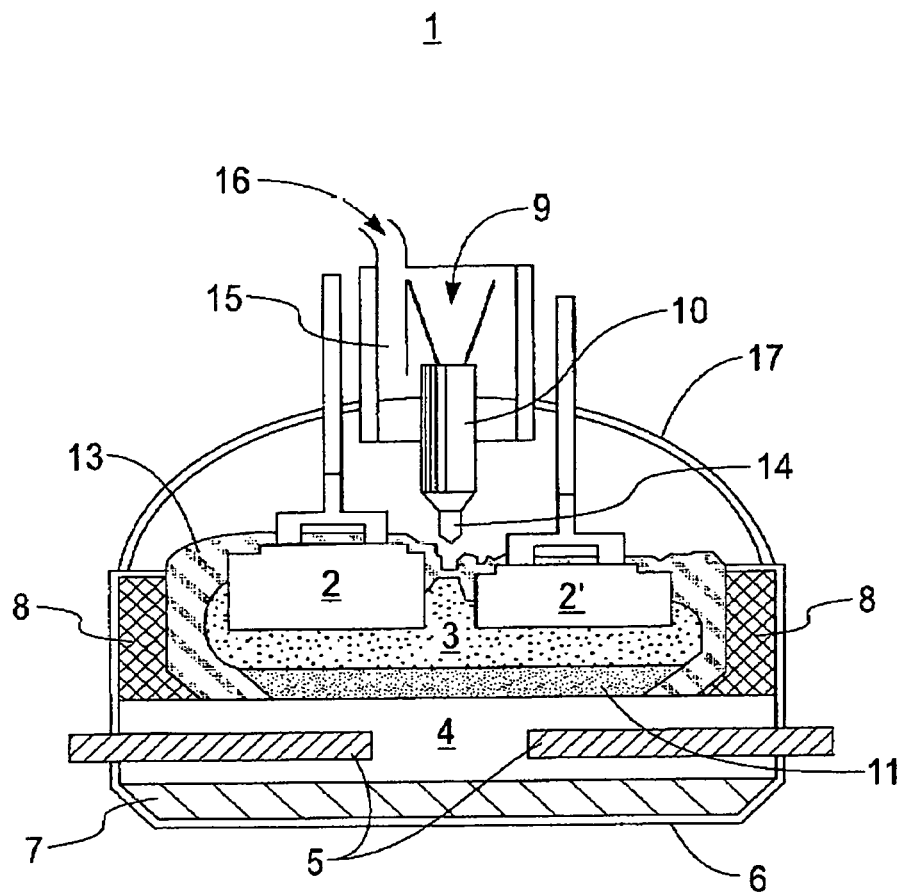
FIG. 1 is a side view of an electrolytic smelter.

FIG. 1 is a cross section of an aluminum producing pot 1 containing pre-baked carbon anodes used in the Hall-Heroult smelting process. The pot depicted is one of many that are connected electrically in series to form a "potline."

In each pot, direct current passes from carbon anodes 2, 2', through a cryolite/alumina molten bath solution 3 containing alumina, to the carbon cathode cell 4 and then to the anodes of the next pot and so on down the line. Steel bars 5 embedded in cathode 4 carry the current out of pot 1 while the other pots themselves in line are connected through an aluminum bus-bar system (not shown). Pot 1 further consists of a steel shell base 6 in which carbon cathode lining 8 is housed. Insulation layer 7 is sandwiched between steel shell base 6 and cathode 4. Lining 8 holds the molten cryolite bath 3 containing alumina 9 which is added to the bath via hopper 10 in solution and molten aluminum 11 is created in the process. An electrically insulated superstructure, not shown, mounted above the shell stores alumina 9 automatically delivered via a sealed system, that holds the carbon anodes 2, 2', suspending them in the pot.

Aluminum fluoride is an essential additive in the smelting process as, inter alia, it must be added to the bath to match the soda content of the consumed alumina in order to maintain the optimal sodium fluoride/aluminum fluoride ratio. The small percentage of calcium oxide as a normally occurring impurity in the alumina is sufficient to maintain the desired concentration for calcium fluoride (fluorspar).

The electrolyte 3, which fills the space between anodes 2, 2' in the pot, consists of molten cryolite containing dissolved alumina. A solid crust 13 forms at the surface of the electrolyte. The crust is broken periodically by crustbreaker 14 and alumina 9 is stirred into the electrolyte to maintain the alumina concentration.

As the electrolytic reaction proceeds, aluminum metal, which is slightly denser than the pot bath material, is continuously deposited in a metal pool 11 on the bottom of the pot while oxygen reacts with the carbon material of the anodes to form oxides of carbon. As the anodes are consumed during the process, they must be continuously lowered to maintain a constant distance between the anode and the surface of the metal, which electrically is part of the cathode. The anodes are replaced on a regular schedule.

The volatilized fluorides and gaseous hydrogen fluoride are collected with other gases evolved from the pots by gas-collecting hoods or manifolds in a chamber 15 and are passed through ducts 16 to central gas treatment and recovery facilities (not shown). For gaining access to the interior of the pot, there is a removable gas collection hood 17 continuing upward and arcuately from steel shell base 6.

The present invention focuses on two critical parameters that must be closely monitored for the instant process to proceed efficiently.

First, as electrolysis progresses, the aluminum oxide content of the bath is decreased and is intermittently replenished by feed additions from the pot's alumina storage to maintain the dissolved oxide content at about 2 to 5 percent. If the alumina concentration falls to about 1.5 to 2 percent, the phenomenon of "anode effect" (described above) may occur. The sensors monitoring the pots collect hundreds of variables that reflect the process state, controls signals and control responses that allow the predictive modeling approach in accordance with the present invention to insure that there is a proper alumina concentration of the bath.

Second, as noted above, a bath composition temperature of between about 920° and 980° C. is a critical factor in the aluminum production process. To reduce the melting point of bath (pure cryolite melts at 1009° C.), the bath contains fluorspar and some excess aluminum fluoride, which along with the dissolved alumina, reduces the melting temperature sufficiently to permit the pots to be operated in the 920° to 980° C. range. Reduced operating temperature improves pot efficiency (the CE/EE). Temperature of the bath in the proper range is obtained by adjustment using the predictive modeling method that effectively mines the hidden correlation among the heterogeneous data thus improving the prediction accuracy.

The lynchpin element that ultimately controls the predictive modeling approach of the present invention is a 9-box (3×3) matrix. The present invention uses a generalized framework to determine complex heterogeneity embedded in the data recorded by sensors associated with the pots.

The quest to determine the most efficient temperature range and concentration of $AlF_3$ is solved by applying a regularized non-negative triple factorization to the data provided by the sensors. The regularized non-negative triple factorization simultaneously decomposes the instance-feature and instance label matrices while enforcing the task relatedness, feature type consistency and label correlations on the supplied data.

Figure 2:
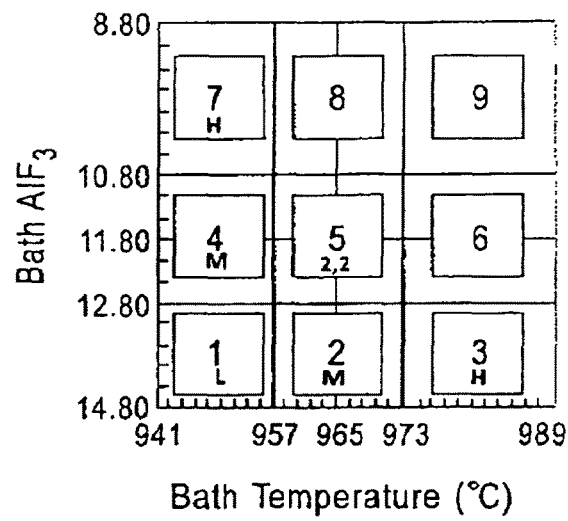
FIG. 2 depicts a 3×3, 9-box matrix that embodies the predictive modeling approach to the present invention.

FIG. 2 is a 9-box matrix that plots temperature as a function of $AlF_3$ concentration, which is explained in greater detail hereinafter.

Hundreds of process variables that reflect the process state are received by controls that comprise power and resistance control, noise control, alumina feed control and chemical combination control. The data received in the aforementioned controls are fed into the 9-box matrix control to predict any needed change in temperature and/or $AlF_3$.

Figure 3:
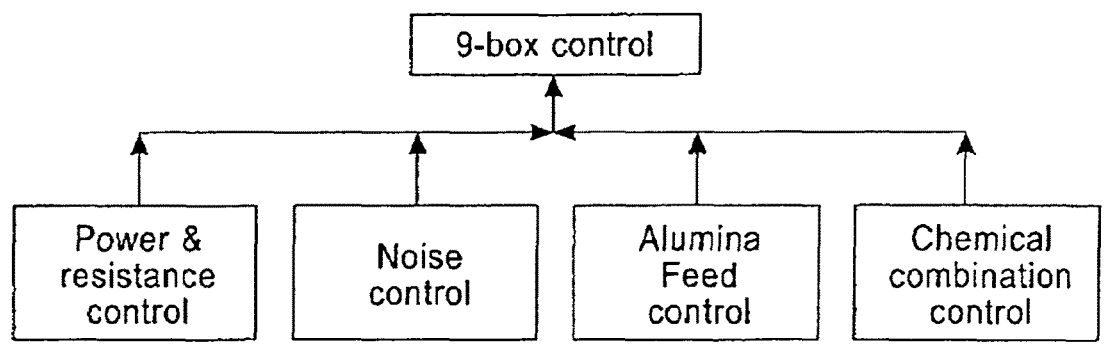
FIG. 3 is a block diagram of the four types of domain control that are based on a range combination of temperature and metal additive such as Aluminum Fluoride.

FIG. 3 is a block diagram of the four types of domain control that are based on the range combination of temperature and Aluminum Fluoride. Each control defined therein possesses specific data unique to the control box that is fed into the 9-box matrix control.

Figure 4:
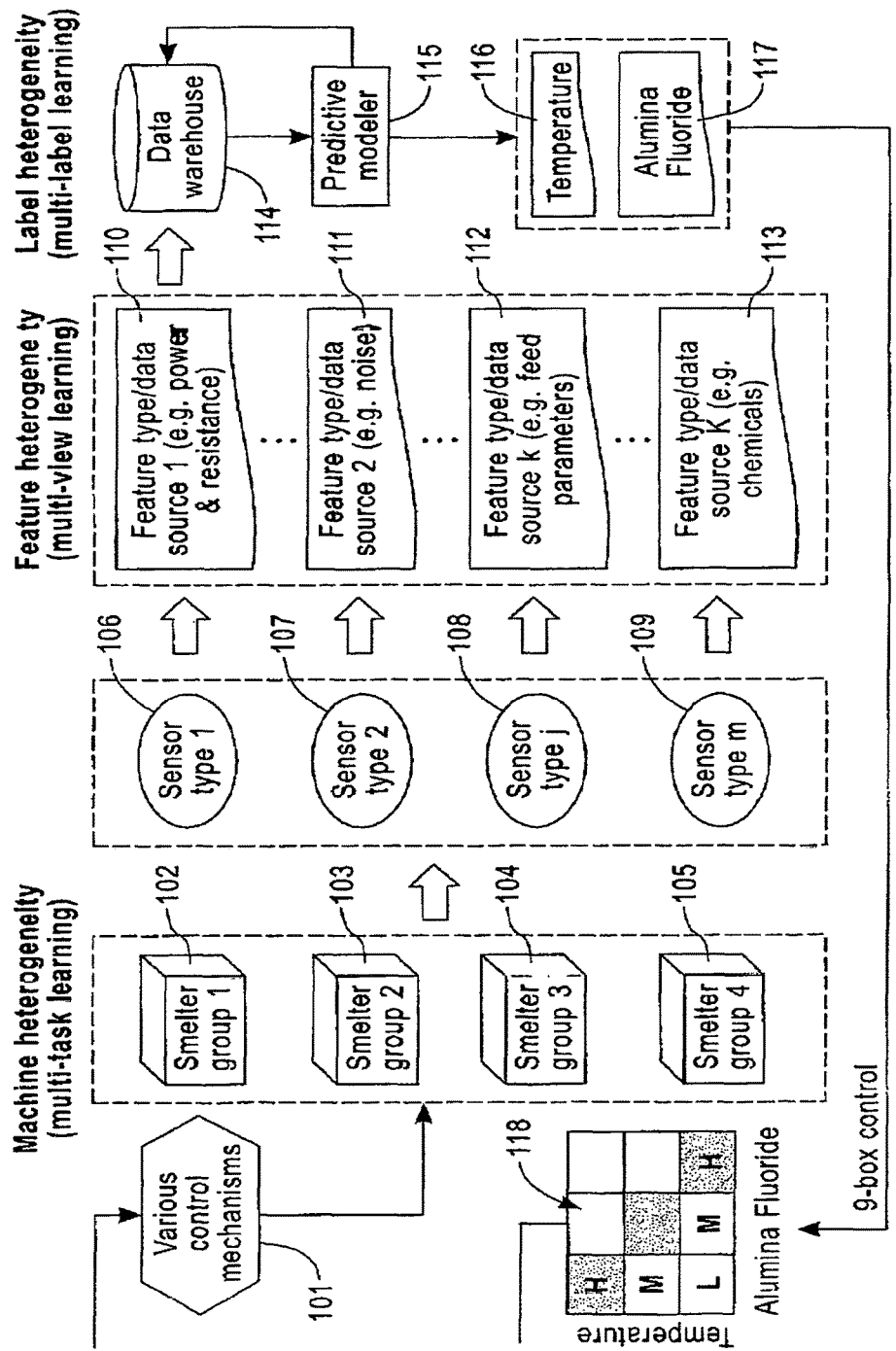
FIG. 4 is a flow diagram of an overview of the elements, methods and systems that are embodied in implementing the present invention.

FIG. 4 is a flow diagram of an overview of the elements, methods and systems that are embodied in implementing the present invention. Control mechanism 101 includes therein various control mechanisms. Control mechanism 101 is a functional block of various control mechanisms, that issues variable control signals comprising a power control for voltage, current, etc.; noise control for a change of resistance, heat, etc.; feed control for feeding the alumina raw material and chemical control for defining the various alloys, such as Na, Si, Fe, etc.

The control signals from Control mechanism 101 are fed to a line of pots in smelters comprising Smelter Group 102, Smelter Croup 103, Smelter Group 104 and Smelter Group 105. These smelters collectively embody what is referred to herein as machine heterogeneity. In processing machine heterogeneity in the system, Applicants use MTL (discussed above), wherein a task is a model associated with the features (process variables) and label/target from a single source, in this case, a pot.

At this stage, the present invention uses MTL as described above, as its approach to machine learning that learns a particular problem together with other related problems at the same time, using a the shared representation noted.

Signals from smelter Groups 102, 103, 104 and 105 are fed to sensors 106 (type 1), 107 (type 2), 108 (type j) and 109 (type m) respectively. The sensors designated types 1, 2, j and m, are functional blocks that collect different types of process data from diverse sources. These sensor sources 106 to 109 respectively comprise feature type data source I consisting of power and resistance data; feature type data source 2 consisting of noise related process variables; feature type data source k consisting of feed parameters; and feature type data source K consisting of various chemical contents.

The data measurements in sensor type 1, 106, sensor type 2, 107, sensor type 3, 108 and sensor type 4, 109 are transmitted to feature type/data source entities comprising source 1, 110 (power and resistance), source 2, 111 (e.g., noise), source k, 112 (e.g., feed parameters) and source K, 113 (e.g., chemicals) respectively. The feature type/data sources depicted collectively embody what is referred to herein as feature heterogeneity. At this stage of the process, multi-view learning is in place. The feature type/data source stored in 110, 111, 112 and 113 is transmitted to data warehouse 114 which operates in collaboration with predictive modeler 115 to predict the optimal data settings for process temperature and $AlF_3$.

The data relating to temperature 116 and alumina fluoride concentration 117 is then fed to the 9-box control 118 which is a functional block that issues a series of signals each of which is based upon, after application of an algorithm, the predicted range of temperature 116 and alumina fluoride concentration 117, designated in the 9-box matrix as ranges L, M and H, (e.g., Low, Moderate, High).

The 9 boxes comprising matrix 118 shown in FIG. 4 define a functional block relationship between the ordinate process temperature and the abscissa $AlF_3$ concentration. The functional relationships are defined at three levels within the boxes in the matrix.

The predictive model is a functional block as noted, that uses a trained model that takes the various feature types of noted/data sources, and predicts control variables, temperature and additives, preferably $AlF_3$ in the case of preparing Al metal. The model is trained based upon historical process data and measurements of temperature and additive (e.g., $AlF_3$).

The data obtained pursuant to the steps detailed above are used to construct a predictive relationship in the predictive via a training data set. Most approaches that search through training data for empirical relationships tend to over-fit the data, meaning that they identify apparent relationships in the training data that do not hold in general. A test set in the present invention is prepared which is a set of data that is independent of the training data, but which follows the same probability distribution as the training data. If a model fit to the training set also fits the test set as well, minimal overfitting has taken place. A better fitting of the training set is preferred as opposed to the test set that usually points to overfitting.

There are a number of methods of learning from multi-view data by considering the diversity of different views. These views may be obtained from multiple sources or different feature subsets. There are a number of representative multi-view learning algorithms in different areas that have been classified into three groups: 1) co-training, 2) multiple kernel learning, and 3) subspace learning.

Co-training style algorithms train alternately to maximize the mutual agreement on two distinct views of the data; multiple kernel learning algorithms exploit kernels that naturally correspond to different views and combine kernels either linearly or non-linearly to improve learning performance; and subspace learning algorithms aim to obtain a latent subspace shared by multiple views by assuming that the input views are generated from this latent subspace.

Due to different control mechanisms, in this feature heterogeneity step in the process, hundreds of process variables are divided into different types or are considered from different sources.

The process data collected at the feature type/data sources are collectively fed to data warehouse 114 which is a functional block that stores valuable process data, measurement of the 9-box control variables and a prediction of 9-box control variables. This segment of the process is referred to as "Label heterogeneity" and "multi label learning."

From data warehouse 114, the refined data is transmitted to predictive modeler 115, which is a functional block that takes various feature types/data sources, synthesizes same and predicts control variables, temperature 116 and alumina fluoride concentration 117.

The predictive model is a functional block as noted, that uses a trained model that takes the various feature types noted/data sources, and predicts control variables, temperature and additives, preferably $AlF_3$ in the case of preparing Al metal. The model is trained based upon historical process data and measurements of temperature and additive (e.g., $AlF_3$).

A test set is prepared which is a set of data that is independent of the training data, but that follows the same probability distribution as the training data. If a model fit to the training set also fits the test set as well, minimal overfitting has taken place. A better fitting of the training set is preferred as opposed to the test set that usually points to overfitting.

FIG. 2 is a more detailed depiction of 3×3, 9 Box Grid 118 of FIG. 4 plotting a specific temperature range along the X axis as a function of $AlF_3$ concentration along the Y axis and includes box or zone consecutive identifying numbers (1 to 9) with the ranges covered within the corresponding limits of each numbered zone. In the 9 box matrix with the numbers listed adjacent the axes, both temperature and alumina fluoride have preferred target ranges that provide for a maximum efficiency of the smelting process (i.e., ranges at which temperature and $AlF_3$ concentration synergistically combine to provide an absolute maximum result in improving process control and energy efficiency for a smelting process.

In accordance with the present invention, the preferred target temperature zone, as depicted in FIG. 3 is 965°-1-8° C., which is in medium temperature zone 5-9 box $matrix_{22}$. In FIG. 3, (941°–957° C. is the low temperature zone (L), and 973°–989° C. is the high temperature zone (H).

Similarly, low, medium and high alumina fluoride zones are defined based on its target value which is also located in zone 5 (10.80–12.80).

Ideally, the pot conditions are controlled within medium temperature and medium alumina fluoride both of which are in zone 5 in the matrix at row 2, column 2.

In the present invention, as noted above, there are various control mechanisms that are essential in implementing the process.

Among the control mechanisms there are a number of functional blocks. As noted above, there is a functional block that issues variable control signals relating to power control, (voltage, current), noise control, (change of resistance, heat, etc.), feed control (supplying the alumina dirt to the pots) and chemical control, (monitoring the formation of various alloys, such as Na, Si, Fe, etc.). In addition there is a functional block that hosts the metal (aluminum) smelting process in the smelter groups. There are hundreds of smelter pots in series that have diverse structures that are significantly different due to generation and design.

There is also a functional block that collects different types of process data such as power related process variables, noise related process variables, various raw material feeding parameters, various chemical contents, etc.

As a result of the various different control mechanisms enumerated above, hundreds of process variables can be divided into types or considered from different sources.

The data warehouse 114 is a functional block that stores variable process data, measures the 9-box control variables and predicts the 9-box control variables.

The predictive modeler 115 is a functional box that uses a trained model, takes the various feature types/data sources, and predicts control variables, temperature and alumina fluoride. The model is trained based upon historical process data and measurements of temperature and alumina fluoride.

Finally, the 9-box control as described above is a designated as a functional block that issues a series of control signals based upon the range of temperature and alumina fluoride as described above and illustrated in FIG. 2.

Figure 5:
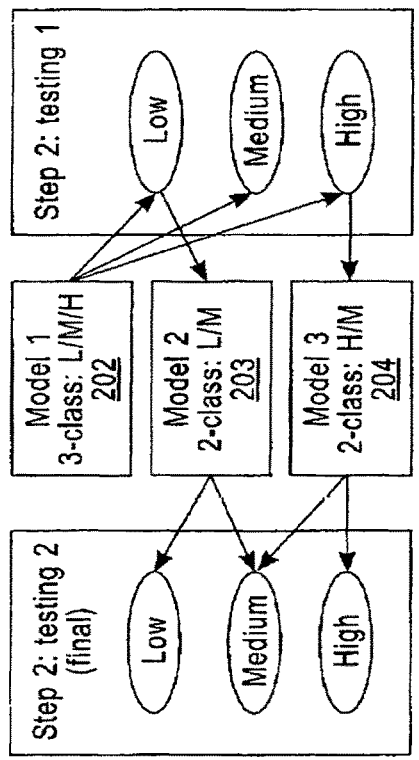
FIG. 5 depicts the predictive modeling approach of the present invention.

FIG. 5 depicts the initial predictive modeling approach 201. The first step in this approach is to formulate a training step which develops a set of examples used for learning that is to fit the parameters [i.e., weights] of the classifier. Referring to 9-box matrix depicted in FIG. 4, 118, Model 1, 202 is a 3-class: L/M/H; Model 2, 203 is a 2-class: L/M and Model 3, 204 is a 2-class: H/M.

In Step 1 (training), Model 1(202) trains a 3-classification model which comprises a random forest using all of the training data. This is illustrated in FIG. 2 by the arrows extending from Model 1 (202) to the entries "Low Medium High" set forth in Step 2: testing 1.

Model 2 (203) of Step 1, trains a binary classification model. Model 2 uses training data belonging to the 2-class low and medium (L/M). This is illustrated in FIG. 2 by the arrow extending from "Low" in Step 2, testing to Step 1, Model 2, 2-class: L/M.

Model 3 (204) of Step 1, trains a 2 binary classification model. Model 3 uses training data belonging to the 2-class high and medium. This is illustrated in FIG. 2 by the arrow extending from "High" in Step 2, testing to Step 1, Model 3, 2-class: H/M.

In Step 2, final, the 3-class model 1 (202) is applied to the L/M/H test data for a predictive result. If the prediction is low, Model 2 (203) is applied and the output is low or medium.

In Step 2, final, the 3-class model 1 (202) is applied to the L/M/H test data for a predictive result. If the prediction is medium, Model 2 (203) the output is medium.

In Step 2, final, the 3-class model 1 (202) is applied to the L/M/H test data for a predictive result. If the prediction is high, Model 3 (204) is applied and the output is high or medium.

FIG. 6 presents the next step in the predictive modeling approach. It considers Model 2 (203) and Model 3 (204) of FIG. 5 and decomposes the instance-feature data ($\tilde{X}_{ij}$) into 3 non-negative matrices ($\tilde{R}_i$, $M_{ij}$, $C_j$). The next step is to decompose the instance-label data ($Y_i$) into 3 non-negative matrices ($R_i$, $M_{iY}$, $C_Y$). The final step is to regularize task relatedness, view (feature type) consistence and label correlations.

As has been stated above, a critical feature of the present invention resides in employing a non-negative matrix triple factorization calculation to model task relatedness by requiring that different feature types across different tasks share the same feature clustering coefficients and enhance feature type consistency by requiring that the instances (i.e., data points) share the same instance clustering coefficients across differ feature types, and model the label correlations by requiring that the labels share the same label clustering coefficients across different tasks.

Matrix factorization or matrix decomposition refers to the transformation of a given matrix into a right-hand-side product of canonical matrices.

Non-negative matrix factorization (NMF), as used in the present invention, is a group of algorithms in multivariate analysis and linear algebra where a matrix V is factorized into (usually) two matrices W and H, with the property that all three matrices have no negative elements. This non-negativity makes the resulting matrices easier to inspect. Non-negativity is inherent to the data being considered.

Since predictive modeling approach problems are not exactly solvable in general, they are commonly approximated numerically.

The purposes of matrix factorization as employed in the present invention involves two aspects: computational convenience and analytic simplicity. Generally, it is not feasible for most of the matrix computations to be calculated in an optimal explicit way, such as matrix inversion, matrix determinant, etc. Thus to convert a difficult matrix computation problem into several easier tasks such as solving triangular or diagonal system will greatly facilitate the calculations. Data matrices representing some numerical observations such as proximity matrix or correlation matrix are often huge and hard to analyze, therefore to decompose the data matrices into some lower-order or lower-rank canonical forms reveal the inherent characteristic and structure of the matrices and help to interpret their meaning.

With respect to task relatedness, for the $j^{th}$ view/feature type, the decomposition of $(\tilde{X}_{ij})$ in different tasks, shares the same feature encoding matrix $(C_j)$. As to view feature consistence, for the $i^{th}$ task, the decomposition of $(\tilde{X}_{ij})$ in different views share the same instance encoding matrix $R_i$. Referring to label correlations, the labels share the same label encoding matrix $C_Y$ across different tasks.

Finally, $M_{ij}$ models the correlation between the instance clusters and the feature clusters and $M_{iY}$ models the correlation between the instance clusters and the label clusters. The next step is to solve the objective function iteratively.

Without loss of generality, assume that there are two tasks and two views.

The view consistence is modeled by sharing the instance encoding matrix $R_1$ (or $R_2$) across different feature types; the task relatedness is modeled by sharing the feature encoding matrix $C_1$ (or $C_2$) across different tasks; the label correlation, is modeled by sharing the label encoding matrix $C_Y$ across different tasks.

An "instance" as used herein is a single object of the world from which a model is learned, or on which a model will be used (e.g., for prediction). In most machine learning work, instances are described by feature vectors, which is a quantity describing an instance. An "attribute" as used herein has a domain defined by the attribute type, which denotes the values that can be taken by an attribute.

The following domain types are common:
a. Categorical. A finite number of discrete values. The type nominal denotes that there is no ordering between the values, such as last names and colors. The type ordinal denotes that there is an ordering, such as in the present invention, an attribute taking on the values low, medium, or high.
b. Continuous (quantitative) The subset of real numbers, where there is a measurable difference between the possible values. For the most part, integers are treated as continuous in practical problems.

More specifically, referring to FIG. 6, $X_{11}$, $X_{12}$, $X_{21}$ and $X_{22}$ via non-negative matrix factorization are decomposed into three matrices specifically identified approximately as instance feature data: $R_1$, $M_{11}$ and $C_1$; $R_1$, $M_{12}$ and $C_2$; $R_2$, $M_{22}$ and $C_1$; $R_2$, $M_{22}$ and $C_2$, respectively, with the C's being shared across feature types. Instance label data $Y_1$ is also decomposed into $R_1$, $M_{1Y}$ and $C_Y$; and $Y_2$ is decomposed into $R_2$; $M_{2Y}$ and $C_Y$.

The general representation of elements depicted in FIG. 6 identified above is as follows:

Let $$\tilde{X}_{ij} = \begin{bmatrix} X_{ij} \\ X_{ij}^u \end{bmatrix} \in \mathcal{R}^{n_i \times d_j}$$

be the instance-feature matrix for the $i^{th}$ task and $j^{th}$ view, where $X_{ij}$ is the training data and $X_{ij}^u$ is the test data.

Let $$\tilde{R}_i = \begin{bmatrix} R_i \\ R_i^u \end{bmatrix} \in \mathcal{R}^{n_i \times p}$$

be the instance encoding matrix where p is the dimensionality of the instance latent space, $R_i$ and $R_i^u$ are for training and test data, respectively.

Let $C_j \in \mathcal{R}^{d_j \times q}$ be the feature encoding matrix, $C_Y \in \mathcal{R}^{m \times q}$ be the label encoding matrix where q is the dimensionality of feature (or label) latent space. Each row in $\tilde{R}_i$ (or $C_j$, $C_Y$) represents the coefficients of the instance (or feature, Label) associated with the instance (or feature, label) clusters.

$M_{ij} \in \mathcal{R}^{p \times q}$, $M_{iY} \in \mathcal{R}^{p \times q}$ is denoted as the colatent space matrices.

Models 2 & 3 are formulated in the following expression as set forth in FIG. 7:

$$\min_{(R,M,C)>0} \Sigma_{i=1}^T \Sigma_{j=1}^V \|\tilde{X}_{ij} - \tilde{R}_i M_{ij} C_j^T\|_F^2 + \alpha \Sigma_{i=1}^T \|Y_i - R_i M_{iY} C_Y^T\|_F^2 + \beta \Sigma_{i=1}^T \Sigma_{j=1}^V \|M_{ij} - M_{iY}\|_F^2;$$

Wherein T is the number of tasks, V is the number of views, M is the number of labels, respectively, F represents Frobenius norm and $\alpha$ and $\beta$ are regularization coefficients.

Example

The method of the present invention as described herein formulated a problem as a regularized non-negative matrix triple factorization problem, which simultaneously decomposed the instance feature and instance-label matrices, while enforcing task relatedness, feature type consistency and label correlations on the data.

The endeavor involved 174 process variables that formed 4 views/feature types based upon the process control practice which included power and resistance, noise control, feed control and chemicals. The data used in this example was collected daily via sensors.

The process was concurrently run in 245 smelters, which are classified in 5 groups (tasks) based upon their design and generation.

The objective of the endeavor was to predict temperature and alumina fluoride when they are not measured using the 9-box control as depicted in FIGS. 2 and 4.

The results of collecting data from the sources and solving the objective function iteratively are reproduced in Table 1.

TABLE 1

| ALGORITHM | $F_1$-Score[1] | Accuracy[2] | Hamming Loss[3] |
|---|---|---|---|
| HiMLS[4] | 0.848 ± .003 | 0.847 ± 003 | 0.140 ± .003 |
| HiMLSD[5] | 0.873 ± .006 | 0.871 ± .006 | 0.115 ± .006 |
| L²F[6] | 0.773 ± .001 | 0772 ± .001 | 0.214 ± .000 |
| ML-kNN[7] | 0.845 ± .001 | 0.842 ± .000 | 0.139 ± .001 |
| LS-ML[8] | 0.852 ± .000 | 0.850 ± .001 | 0.131 ± .001 |
| TRAM[9] | 0.383 ± .001 | 0.381 ± .001 | 0.605 ± .000 |

Table 1 Evaluation Metrics
[1]F-1 Score: The harmonic mean of precision and recall - the larger the better.
[2]Accuracy: For each instance the proportion of the predicted correct labels to the total number of labels for that instance - the larger the better.
[3]Hamming loss: How many times on average, the relevance of an instance to a class label is incorrectly predicted - the smaller the better.
Table 1 Algorithms
[4]HiMLS: The method of the instant invention applied to regression; i.e., to predict the value of temperature and alumina fluoride concentration.
[5]HiMLSD: The method of the instant invention applied to binary classification; i.e., M2 and M3.
[6]L2F: The multi-view, multi-label learning method.
[7]ML-kNN: Graph based multi label method.
[8]LS-ML: multi-label method based upon subspace learning.
[9]TRAM: Transductive multi-label learning method.

The method of the present invention as reflected in Table 1 outperforms all other competitive predictive model methods. The energy efficiency referred to hereinabove is increased about 10% and the cost savings amounts to about $1 million per year.

The matrix factorization or matrix decomposition of the present invention provides an optimal CE/EE, wherein desired process conditions and various control actions are applied to adjust the bath temperature, bath chemical composition, current and aluminum oxide content In summary, smelting production equipment has heterogeneous relatedness. In one embodiment specific to an aluminum manufacturing environment, the production equipment may consist of multiple pots, et al., to produce liquid aluminum formed ultimately into aluminum ingots. Typical to aluminum manufacturing, there are multiple pots included in multiple lines of pots. Accordingly, one liquid aluminum product is produced in one of the multiple pots of one of the multiple lines comprising the production equipment. The production equipment can measure the process variables of each the pots, which indicate the processing of each the aluminum produced by the production equipment. The process variables may be sent to the central database.

The process variables in accordance with the present invention are directed primarily to temperature and $AlF_3$ concentration, but may include, but are not limit to pressures, gas flow per unit time, etc.

The central database includes databases, file systems, or other arrangement of data on nonvolatile memory (e.g., hard disk drives, tape drives, optical drives, etc.), volatile memory (e.g., random access memory (RAM)), or combination thereof. In one embodiment, the central database may receive and store data generated by and sent from the production equipment, the and/or the advanced process controller. The central database may also receive actual temperature and $AlF_3$ concentration quality measurements sent from the actual metrology tool.

The actual wafer quality measurements may be stored by the central database as histories of the actual physical outcomes of the wafers processed by production equipment. In one embodiment, the central database sends the measured process variables and the historical actual wafer quality measurements to the virtual metrology machine to generate a prediction model of the quality of wafers produced by the production equipment.

The central processor received variables and the historical measurements from the central database and predicts the temperature and $AlF_3$ concentration by the production equipment based on the process variables and the historical measurements.

In one embodiment, the pot is connected to the advanced process controller and sends the predicted temperature and $AlF_3$ (alone or in combination) to the advanced process controller to facilitate and improve control of the production equipment. The predicted temperature and $AlF_3$ concentration may also be sent by the pot to the central database for storage.

The advanced process controller may manage some or all operations of the manufacturing environment. In one embodiment, the advanced process controller monitors and controls the This illustrates a conventional computer system within which a set of instructions, for causing the machine to perform any one or more of the methodologies and operations discussed herein, may be executed. Computer system includes a bus or other communication mechanism for communicating information, and a processor or processors coupled with bus for processing information.

Computer system also includes a main memory, such as a random access memory (RAM) or other dynamic storage device, coupled to bus for storing information and instructions to be executed by processor. Main memory also may be used for storing temporary variables or other intermediate information during execution of instructions to be executed by processor 404. Computer system further includes a read only memory (ROM) or other static storage device coupled to bus for storing static information and instructions for processor. A storage device such as a magnetic disk or optical disk, is provided and coupled to bus for storing information and instructions.

Computer system may be coupled via bus to a display, such as a cathode ray tube (CRT), for displaying information to a computer user. An input device, including alphanumeric and other keys, is coupled to bus for communicating information and command selections to processor.

Another type of user input device is cursor control such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

Computer system may be used to process all, using equations and principles discussed herein, into usable data.

The pertinent programs and executable code is contained in main memory and is selectively accessed and executed in response to processor, which executes one or more sequences of one or more instructions contained in main memory. Such instructions may be read into main memory from another computer-readable medium, such as storage device. One or more processors in a multi-processing arrangement may also be employed to execute the sequences of instructions contained in main memory. In alternative embodiments, hard-wired circuitry may be used in place of or in combination with software instructions and it is to be understood that no specific combination of hardware circuitry and software are required.

The instructions may be provided in any number of forms such as source code, assembly code, object code, machine language, compressed or encrypted versions of the foregoing, and any and all equivalents thereof.

"Computer-readable medium" refers to any medium that participates in providing instructions to processor for execution and "program product" refers to such a computer-readable medium bearing a computer-executable program. The computer usable medium may be referred to as "bearing" the instructions, which encompass all ways in which instructions are associated with a computer usable medium.

Computer-readable mediums include, but are not limited to, non-volatile media, volatile media, and transmission media. Non-volatile media include, for example, optical or magnetic disks, such as storage device. Volatile media include dynamic memory, such as main memory 406. Transmission media include coaxial cables, copper wire and fiber optics, including the wires that comprise bus. Transmission media may comprise acoustic or light waves, such as those generated during radio frequency (RF) and infrared (IR) data communications.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor for execution. For example, the instructions may initially be borne on a magnetic disk of a remote computer.

The remote computer can load the instructions into its dynamic memory and send the instructions over a telephone line using a modem. A modem local to computer system can receive the data on the telephone line and use an infrared transmitter to convert the data to an infrared signal. An infrared detector coupled to a bus can receive the data carried in the infrared signal and place the data on bus. Bus carries the data to main memory, from which processor retrieves and executes the instructions. The instructions received by main memory may optionally be stored on storage device either before or after execution by processor.

Computer system may also include a communication interface coupled to bus to provide a two-way data communication coupling to a network link connected to a local network.

For example, communication interface may be an integrated services digital network (ISDN) card or a modem to provide a data communication connection to a corresponding type of telephone line. As another example, communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

Network link typically provides data communication through one or more networks to other data devices. For example, network link may provide a connection through local network to a host computer or to data equipment operated by an Internet Service Provider (ISP).

ISP in turn provides data communication services through the worldwide packet data communication network, now commonly referred to as the "Internet" Local network and Internet both use electrical, electromagnetic or optical signals that carry digital data streams.

What we claim and desire to protect by Letters Patent is:

1. A method for predicting temperature and additive concentration variables in an electrolytic smelting bath process, said variables being regulated together to provide in combination, optimal improvement in the physico-chemical properties of said bath and to lower the temperature of said bath, said optimal combination resulting in a lowering of the melting temperature of said bath at any given time, comprising:

measuring process variables of each pot used in an electrolytic process of forming a pure metal;

sending said process variables to a central database;

receiving said process variables in said central database that was generated in each of said pots and receiving therein historical measurements;

representing respective pots as quality predictive modeling tasks based on said historical measurements;

grouping predictive modeling tasks for said temperature and said additive in said pots according to heterogeneous relatedness of the production equipment, said grouping step being included, for each pot in which a metal ore is simultaneously being processed, grouping said predictive modeling tasks for all of the respective pots, each said pot of the multiple pots being treated as a group of one or more predictive modeling tasks;

partitioning said process variables into two sets comprising generating a prediction model that accommodates said grouping of said pots predictive modeling tasks from said grouping step and said partitioned process variables from said partitioning step;

predicting a temperature and or a concentration of said additive in individual pots based on said prediction model generated in the generating step;

sending predicted values of temperature and additive concentration obtained from each pot to an advanced process controller and the central database;

measuring an actual number value of the temperature and additive concentration in at least one of said pots;

sending said actual number value of the said temperature and said additive concentration in at least one of said pots to an advanced process controller and a virtual machine;

updating said virtual machine with said actual number value of the temperature and additive concentration in at least one of said pots;

determining a feedback control by said advanced process controller;

and processing, by increasing or decreasing said temperature and said additive concentration by the production equipment in accordance with the feedback control, wherein the receiving, representing, grouping, partitioning, generating, and predicting steps are executed by a virtual machine implemented on a computer, and, wherein said additive is aluminum fluoride ($AlF_3$) and ranges of data measurements generated in said pots and received in said central database comprise various process control mechanisms comprising power and resistance control, noise control, alumina feed control and chemical combination data, all of which are classified in a functional 3×3, 9-box matrix control block that issues a series of control signals based upon a low (L), medium (M) and high (H) range of the functional relationship between bath temperature and aluminum fluoride ($AlF_3$), the optimal bath temperature and $AlF_3$ concentration ranges for maximum efficiency being located in Box 2.2 of a 3×3, 9-box matrix plotting ideal bath temperature comprising the vertical ordinate axis as a function of AlF$_3$ concentration ranges comprising the horizontal abscissa axis thereof;

said functional 3×3, 9-box matrix being that depicted in FIG. 2 hereof, which is hereby incorporated herein by reference as if set forth identically herein.

2. The method defined in claim 1 wherein said various process control mechanisms are connected in series to smelter groups 1 through 4 through n, which host a smelting process, and which comprise machine heterogeneity, said smelter groups being connected in series respectively to a sensor type functional block comprising a sensor type 1, a sensor type 2, a sensor type j, a sensor type m, through to sensor n, each said sensor collecting one of the feature type data source measurements selected from the power and resistance variables, noise related process variables, various feeding parameters and various chemical contents; and the plurality of process variables resulting from the sensor measurement in a feature heterogeneity stage is divided into different types of said variables as taken from different sources;

the data from said feature heterogeneity stage is transmitted to a data warehouse which is a functional block that stores said variable process data, measures said 3×3, 9-box control variables and predicts the 9-box control variables;

the output of the data warehouse is transmitted to a predictive modeler that is a functional block that uses a trained model that processes a plurality of feature types and data sources and, based upon historical process data and measurements of temperature and AlF$_3$, predicts control measurements of bath temperature and concentration of AlF$_3$;

the data obtained from said trained model is transmitted to said 3×3, 9-box matrix control that issues a series of control signals based upon the range of temperature and AlF$_3$ concentration.

3. The method defined in claim 2 wherein said modeling approach comprises the following steps:

train a random forest three class Model 1 using all training test data developed and stored in said data warehouse;

train a binary classification Model 2 using training data belonging to a class high (H) and medium (M);

apply said 3-class Model 1 to said test data;

if predicted low beneath Box$_{22}$, apply Model 2, output is low or medium;

if predicted medium, output is medium, if predicted high above Box$_{22}$ apply Model 3, output is high or medium.

4. The method defined in claim 3 wherein triple types of complex heterogeneity embedded in the data using said predictive modeling approach with respect to Model 2 and Model 3 is determined using a regularized non-negative matrix triple factorization operation based upon the depicted matrix in FIG. 6 hereof, which Figure is hereby incorporated herein by reference as if set forth identically herein;

wherein instance feature data ($\tilde{X}_{ij}$) is decomposed into 3 non-negative matrices; and wherein instance label data ($Y_i$) is decomposed into 3 non-negative matrices;

the task relatedness, view/feature type, consistence and label correlations are regularized, subject to the limitations wherein:

with respect to task relatedness, the jth view feature type, the decomposition of ($\tilde{X}_{ij}$) in different tasks shares the same feature encoding matrix $C_j$;

with respect to view/feature consistence, for the ith task, the decomposition of ($\tilde{X}_{ij}$) in different views shares the same feature encoding matrix $R_i$;

with respect to the label correlations, the labels share the same label encoding matrix $C_Y$ across different tasks;

$M_{ij}$ models the correlations between instance clusters and feature clusters;

$M_{iY}$ models the correlations between instance clusters and label clusters;

said method simultaneously decomposes the instance-feature and instance label matrices, while concurrently enforcing task relatedness, feature type consistency and label correlations on said data.

5. The method defined in claim 4 wherein said hidden correlations among said heterogeneous data is governed according to:

$$\min_{\{R,M,C\}>O} \sum_{i=1}^{T} \sum_{j=1}^{V} \|\tilde{X}_{ij} - \tilde{R}_i M_{ij} C_j^T\|_F^2 + \alpha \sum_{i=1}^{T} \|Y_i - R_i M_{iY} C_Y^T\|_F^2 + \beta \sum_{i=1}^{T} \sum_{j=1}^{V} \|M_{ij} - M_{iY}\|_F^2$$

wherein T is the number of tasks, V is the number of views, M is the number of labels, respectively, F represents Frobenius norm and α and β are regularization coefficients.

6. A method for operating a smelter to produce a pure base metal, said method comprising producing said pure base metal in pots with the aid of a digital computer and a central database for storing data derived from a metal smelter process to produce a pure base metal, said data comprising process variables comprising power and resistance, noise control, feed control and chemicals received from said pots for said smelter process, comprising:

means for mining hidden correlations among heterogeneous data within said central database;

means decomposing instance feature data ($\tilde{X}_{ij}$) into three non-negative matrices;

means decomposing instance feature data ($Y_i$) into three non-negative matrices;

means regularizing task relatedness, view (feature type) consistence and label correlations;

means for determining the objective function iteratively;

wherein for said task relatedness, the jth view/feature type, said decomposition of $\tilde{X}_{ij}$ in different tasks shares the same feature encoding matrix $C_j$;

wherein, for said ith task, said decomposition said decomposition of $\tilde{X}_{ij}$ in different tasks shares the same feature encoding matrix $R_i$;

wherein for said label correlations, said labels share the same label encoding matrix $C_Y$ across different tasks; and instance clusters and label clusters, wherein $M_{ij}$ models the correlation between instance clusters and feature clusters, and wherein $M_{iY}$ models the correlation between instance clusters and label clusters; and, wherein said additive is aluminum fluoride (AlF$_3$) and ranges of data measurements generated in said pots and received in said central database comprise various process control mechanisms comprising power and resistance control, noise control, alumina feed control and chemical combination data, all of which are classified in a functional 3×3, 9-box matrix control block that issues a series of control signals based upon a low (L), medium (M) and high (H) range of the functional relationship between bath temperature and aluminum fluoride (AlF$_3$), the optimal bath temperature and AlF$_3$ concentration ranges for maximum efficiency being located in Box 2.2 of a 3×3, 9-box matrix plotting ideal bath temperature comprising the vertical ordinate axis as a function of AlF3 concentration ranges comprising the horizontal abscissa axis thereof;

said functional 3×3, 9-box matrix being that depicted in FIG. 2 hereof, which is hereby incorporated herein by reference as if set forth identically herein.

7. The method defined in claim 6 wherein said various process control mechanisms are connected in series to smelter groups 1 through 4 through n, which host the smelting process, and which comprise machine heterogeneity, said smelter groups being connected in series respectively to a sensor type functional block comprising a sensor type 1, a sensor type 2, a sensor type j, a sensor type m, through to sensor n, each said sensor collecting one of the feature type data source measurements selected from the power and resistance variables, noise related process variables, various feeding parameters and various chemical contents; and the plurality of process variables resulting from the sensor measurements in a feature heterogeneity stage is divided into different types of said variables as taken from different sources;

the data from said feature heterogeneity stage is transmitted to a data warehouse which is a functional block that stores said variable process data, measures the 3×3, 9-box control variables and predicts the 3×3, 9-box control variables;

the output of the data warehouse is transmitted to a predictive modeler that is a functional block that uses a trained model that processes a plurality of feature types and data sources and, based upon historical process data and measurements of temperature and AlF$_3$, predicts control measurements of bath temperature and concentration of AlF$_3$;

the data obtained from trained model is transmitted to said 3×3, 9-box matrix control that issues a series of control signals based upon the range of temperature and AlF$_3$, said functional 3×3, 9-box matrix being that depicted in FIG. 2 hereof, which is hereby incorporated herein by reference as if set forth identically herein.

8. The method defined in claim 7 wherein said modeling approach comprises the following steps:
train a random forest three class Model 1 using all training test data developed and stored in said data warehouse;
train a binary classification Model 2 using training data belonging to a class high (H) and medium (M);
apply said 3-class model to test data;
if predicted low beneath, Box 2.2 apply Model 2, output is low or medium;
if predicted medium, output is medium, if predicted high above Box 2.2 apply Model 3, output is high or medium.

9. The method defined in claim 8 wherein triple types of heterogeneity embedded in the data using said predictive modeling approach with respect to Model 2 and Model 3 is determined using a regularized non-negative matrix triple factorization operation based upon the depicted matrix in FIG. 6 hereof which is hereby incorporated herein by reference as if set forth identically herein;
wherein instance feature data ($\tilde{X}_{ij}$) is decomposed into 3 non-negative matrices; and wherein instance label data ($Y_i$) is decomposed into 3 non-negative matrices;
the task relatedness, view/feature type, consistence and label correlations are regularized, subject to the limitations wherein:
with respect to task relatedness, the jth view feature type, the decomposition of ($\tilde{X}_{ij}$) in different tasks shares the same feature encoding matrix $C_j$;
with respect to view/feature consistence, for the ith task, the decomposition of ($\tilde{X}_{ij}$) in different views shares the same feature encoding matrix $R_i$;
with respect to the label correlations, the labels share the same label encoding matrix $C_Y$ across different tasks;
$M_{ij}$, models the correlations between instance clusters and feature clusters;
$M_{iY}$, models the correlations between instance clusters and label clusters.

10. The method defined in claim 9 wherein said hidden correlations among said heterogeneous data is governed according to:

$$\min_{\{R,M,C\}>O} \sum_{i=1}^{T} \sum_{j=1}^{V} \|\tilde{X}_{ij} - \tilde{R}_i M_{ij} C_j^T\|_F^2 +$$

$$\alpha \sum_{i=1}^{T} \|Y_i - R_i M_{iY} C_Y^T\|_F^2 + \beta \sum_{i=1}^{T} \sum_{j=1}^{V} \|M_{ij} - M_{iY}\|_F^2$$

wherein T is the number of tasks, V is the number of views, M is the number of labels, respectively, F represents Frobenius norm and α and β are regularization coefficients.

11. A non-transitory computer readable storage medium having a computer readable program code stored therein, said computer readable code embodied therein storing a program of instructions adapted to be executed to implement a method for predicting temperature and additive concentration variables in an electrolytic smelting bath process, said variables being regulated together to provide in combination, optimal improvement in the physico-chemical properties of said bath and to lower the temperature of said bath, said optimal combination resulting in a lowering of the melting temperature of said bath at any given time, comprising:
measuring process variables of each pot used in an electrolytic process of forming a pure metal;
sending said process variables to a central database;
receiving said process variables in said central database that was generated in each of said pots and receiving therein historical measurements;
representing respective pots as quality predictive modeling tasks based on said historical measurements;
grouping predictive modeling tasks for said temperature and said additive in said pots according to heterogeneous relatedness of the production equipment, said grouping step being included, for each pot in which a metal ore is simultaneously being processed,
grouping said predictive modeling tasks for all of the respective pots, each said pot of the multiple pots being treated as a group of one or more predictive modeling tasks;
partitioning said process variables into two sets comprising generating a prediction model that accommodates said grouping of said pots predictive modeling tasks from said grouping step and said partitioned process variables from said partitioning step;

predicting a temperature and or a concentration of said additive in individual pots based on said prediction model generated in the generating step;

sending predicted values of temperature and additive concentration obtained from each pot to an advanced process controller and the central database;

measuring an actual number value of the temperature and additive concentration in at least one of said pots;

sending said actual number value of the said temperature and said additive concentration in at least one of said pots to an advanced process controller and a virtual machine;

updating said virtual machine with said actual number value of the temperature and/or additive concentration in at least one of said pots;

determining a feedback control by said advanced process controller;

and processing, by increasing or decreasing said temperature and said additive concentration by the production equipment in accordance with the feedback control, wherein the receiving, representing, grouping, partitioning, generating, and predicting steps are executed by a virtual machine implemented on a computer;

wherein said additive is aluminum fluoride ($AlF_3$) and ranges of data measurements generated in said pots and received in said central database comprise various process control mechanisms comprising power and resistance control, noise control, alumina feed control and chemical combination data, all of which are classified in a functional 3×3, 9-box matrix control block that issues a series of control signals based upon a low (L), medium (M) and high (H) range of the functional relationship between bath temperature and aluminum fluoride ($AlF_3$), the optimal bath temperature and $AlF_3$ concentration ranges for maximum efficiency being located in Box 2.2 of a 3×3, 9-box matrix plotting ideal bath temperature comprising the vertical ordinate axis as a function of $AlF_3$ concentration ranges comprising the horizontal abscissa axis thereof;

said functional 3×3, 9-box matrix being that depicted in FIG. 2 hereof, which is hereby incorporated herein by reference as if set forth identically herein.

12. The method defined in claim 11 wherein said various process control mechanisms are connected in series to smelter groups 1 through 4 through n, which host the smelting process, and which comprise machine heterogeneity, said smelter groups being connected in series respectively to a sensor type functional block comprising a sensor type 1, a sensor type 2, a sensor type j, a sensor type m, through to sensor n, each said sensor collecting one of the feature type data source measurements selected from the power and resistance variables, noise related process variables, various feeding parameters and various chemical contents; and the plurality of process variables resulting from the sensor measurement in a feature heterogeneity stage is divided into different types of said variables as taken from different sources;

the data from said feature heterogeneity stage is transmitted to a data warehouse which is a functional block that stores said variable process data, measures said 3×3, 9-box control variables and predicts the 9-box control variables;

the output of the data warehouse is transmitted to a predictive modeler that is a functional block that uses a trained model that processes a plurality of feature types and data sources and, based upon historical process data and measurements of temperature and $AlF_3$, predicts control measurements of bath temperature and concentration of $AlF_3$;

the data obtained from said trained model is transmitted to said 3×3, 9-box matrix control that issues a series of control signals based upon the range of temperature and $AlF_3$ concentration.

13. The method defined in claim 12 wherein said modeling approach comprises the following steps:

train a random forest three class Model 1 using all training test data developed and stored in said data warehouse;

train a binary classification Model 2 using training data belonging to a class high (H) and medium (M);

apply said 3-class Model 1 to said test data;

if predicted low beneath $Box_{22}$, apply Model 2, output is low or medium;

if predicted medium, output is medium, if predicted high above $Box_{22}$ apply Model 3, output is high or medium.

14. The method defined in claim 13 wherein triple types of complex heterogeneity embedded in the data using said predictive modeling approach with respect to Model 2 and Model 3 is determined using a regularized non-negative matrix triple factorization operation based upon the depicted matrix in FIG. 6 hereof, which is hereby incorporated herein by reference as if set forth identically herein;

wherein instance feature data ($\tilde{X}_{ij}$) is decomposed into 3 non-negative matrices; and wherein instance label data ($Y_i$) is decomposed into 3 non-negative matrices;

the task relatedness, view/feature type, consistence and label correlations are regularized, subject to the limitations wherein:

with respect to task relatedness, the jth view feature type, the decomposition of ($\tilde{X}_{ij}$) in different tasks shares the same feature encoding matrix $C_j$;

with respect to view/feature consistence, for the ith task, the decomposition of ($\tilde{X}_{ij}$) in different views shares the same feature encoding matrix $R_i$;

with respect to the label correlations, the labels share the same label encoding matrix $C_Y$ across different tasks;

$M_{ij}$ models the correlations between instance clusters and feature clusters;

$M_{iY}$ models the correlations between instance clusters and label clusters;

said method simultaneously decomposes the instance-feature and instance label matrices, while concurrently enforcing task relatedness, feature type consistency and label correlations on said data.

15. The method defined in claim 14 wherein said hidden correlations among said heterogeneous data is governed according to:

$$\min_{\{R,M,C\}>O} \sum_{i=1}^{T} \sum_{j=1}^{V} \|X_{ij} - R_i M_{ij} C_j^T\|_F^2 +$$

$$\alpha \sum_{i=1}^{T} \|Y_i - R_i M_{iY} C_Y^T\|_F^2 - \beta \sum_{i=1}^{T} \sum_{j=1}^{V} \|M_{ij} - M_{iY}\|_F^2$$

wherein T is the number of tasks, V is the number of views, M is the number of labels, respectively, F represents Frobenius norm and $\alpha$ and $\beta$ are regularization coefficients.

* * * * *